Nov. 10, 1925. 1,560,824
I. S. KARRAZ ET AL
COMPUTING BIN
Filed Oct. 19, 1923   2 Sheets-Sheet 2
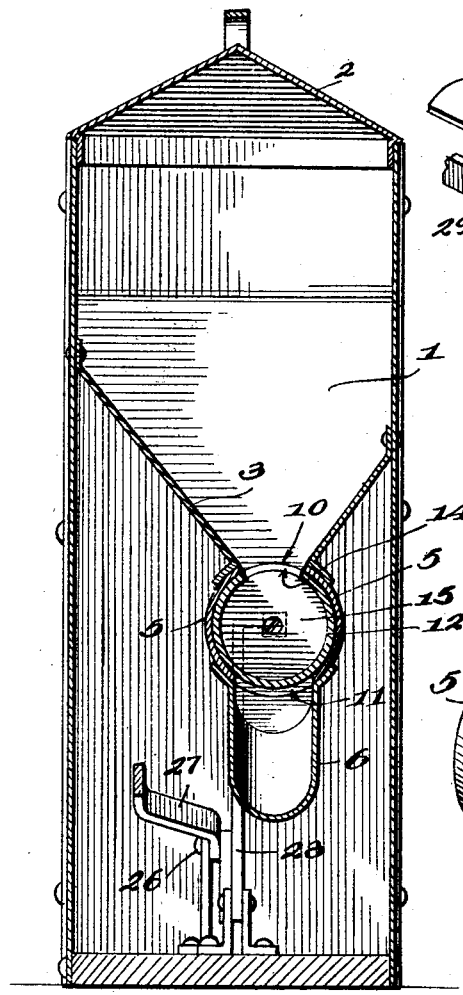
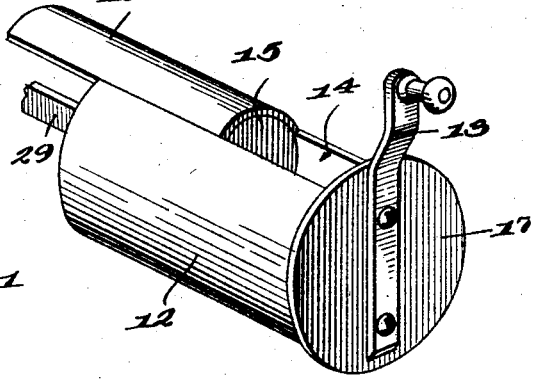
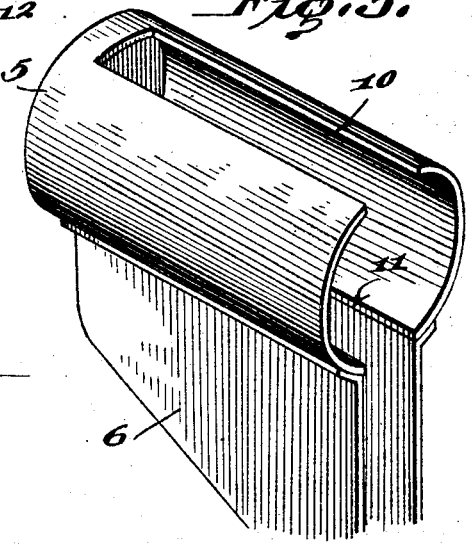
WITNESSES
J. F. Schrott
INVENTORS
I. S. Karraz and
D. V. Bridwell
BY
ATTORNEYS Patented Nov. 10, 1925.

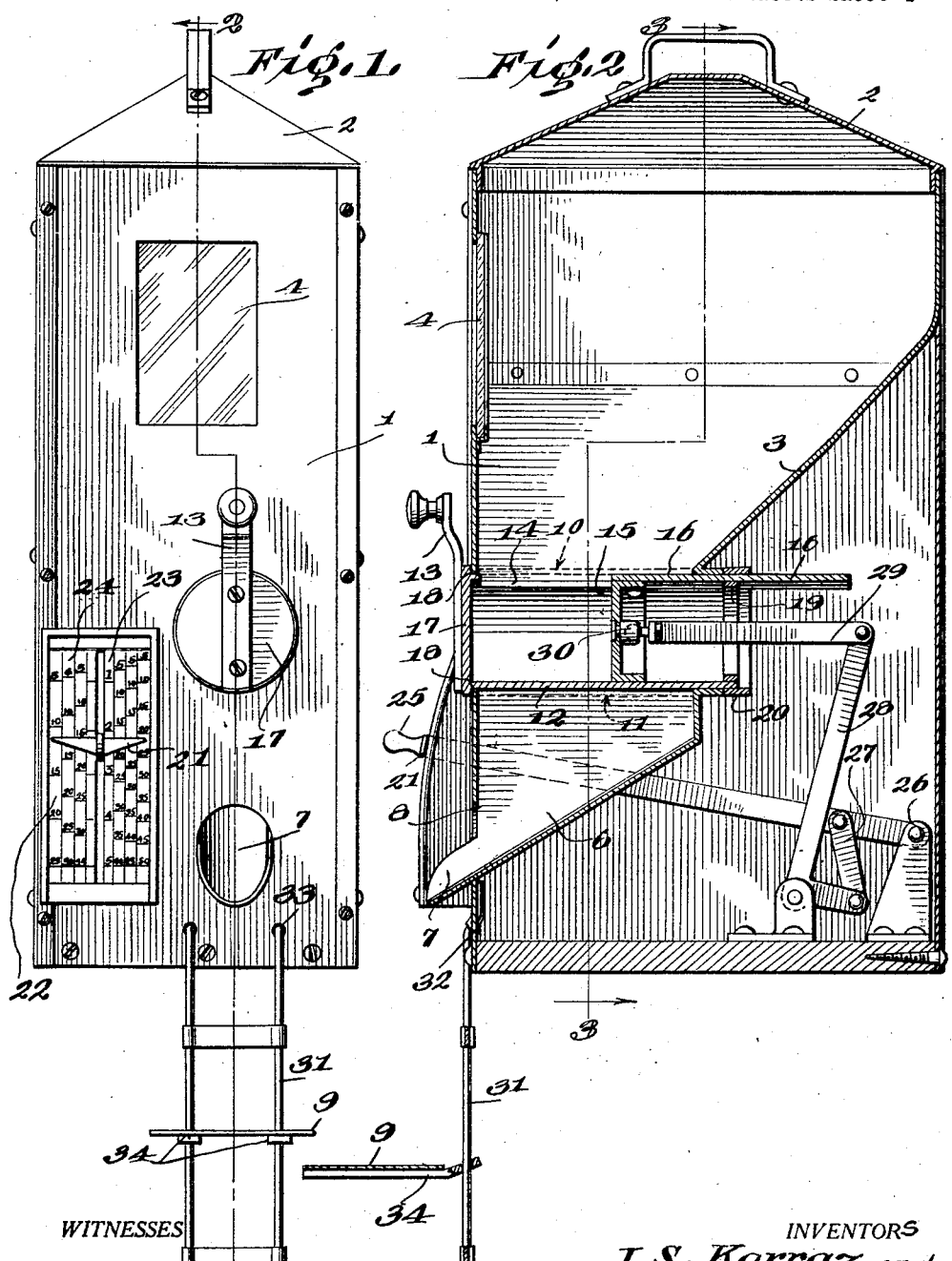

1,560,824

UNITED STATES PATENT OFFICE.

ISAAC S. KARRAZ AND DOUGLAS V. BRIDWELL, OF BRINKLEY, ARKANSAS; SAID BRIDWELL ASSIGNOR TO SAID KARRAZ.

COMPUTING BIN.

Application filed October 19, 1923. Serial No. 669,597.

*To all whom it may concern:*

Be it known that we, ISAAC S. KARRAZ and DOUGLAS V. BRIDWELL, citizens of the United States, and residents of Brinkley, in the county of Monroe and State of Arkansas, have invented certain new and useful Improvements in Computing Bins, of which the following is a specification.

Our invention relates to improvements in dispensing apparatus, being adapted more particularly for dispensing commodities such as sugar, rice, coffee, etc., and it consists of the constructions, combinations and arrangements herein described and claimed.

An object of the invention is to provide dispensing apparatus in the nature of a bin which holds the material to be dispensed, there being a marker which is movable, over a suitably graduated scale to indicate the positions of a plunger in a measuring cylinder into which the material is adapted to flow and from which it is adapted to be discharged.

A further object of the invention is to provide a dispensing apparatus having a measuring cylinder which is rotatable under a bin that holds the material, this cylinder being movable to filling and discharging positions and having a plunger to regulate the capacity of the cylinder.

Other objects and advantages will appear in the following specification, reference being had to the accompanying drawings, in which—

Figure 1 is a front elevation of the improved dispensing apparatus or computing bin.

Figure 2 is a vertical longitudinal section on the line 2—2 of Figure 1,

Figure 3 is a cross section on the line 3—3 of Figure 2.

Figure 4 is a detail perspective view of the revoluble measuring cylinder.

Figure 5 is a detail perspective view of the fixed cylinder and a portion of the discharge chute.

In carrying out the invention, provision is made of a bin 1 which is of rectangular configuration as shown in the drawings. The bin is made of any suitable material and is of any desired size. It is preferably made of metal so as to be proof in a large measure against the attacks of rats, mice, vermin, etc.

A lid 2 covers the top of the bin through which the material to be dispensed is dumped into the hopper 3. The contents of the hopper are visible through a window 4 in front of the bin (Fig. 1), and the visual indication of the contents may be supplemented by such signs, legends, etc., as may be appropriate.

Fixed to the bottom of the hopper 3 is a cylinder 5 which has a pendant discharge chute 6 communicating with a spout 7 at the front. The spout is part of the chute and the spout projects through an opening 8 in the front of the bin to properly direct the discharging material into a suitable container on the shelf or floor 9 (Figs. 1 and 2). An opening 10 furnishes the communication between the chute 3 and the fixed cylinder 5. Similarly, an opening 11 offers communication between the cylinder and the chute 6.

Mounted inside of the fixed cylinder 5 is the measuring cylinder 12 which is rotatable by means of a handle 13 to bring the longitudinal opening 14 alternatively into filling and discharging positions in respect to the openings 10 and 11 of the hopper 3 and chute 6 respectively. When in the first position material flows in from the hopper 3 until the rotatable cylinder 12 is filled. Upon turning the handle 13 the opening 14 is brought out of registration with the opening 10 and moved toward the discharging position at the opening 11 above the chute 6.

The capacity of the measuring cylinder 12 is regulated by means of a plunger 15 which fits the cylinder as shown in Figure 2. The plunger 15 carries a closure plate 16 which rides in the opening 14 of the cylinder and is adapted to close all of the opening excepting that to the front of the plunger. To this end the plate 16 is fastened on the plunger 15 flush with the front surface, the leaf extending back into the bin as shown in Figure 2. Should the plunger 15 be adjusted as far forwardly as it will go in the measuring cylinder 12 the leaf 16 would close the posterior portion of the opening 14 so that none of the material would run into the cylinder in back of the plunger.

The front of the measuring cylinder 12 is closed by a disk 17 which is peripherally rabbetted at 18 to fit the opening in the front of the bin 1 and to form a joint sufficiently close to prevent the leakage of any of the material from the hopper 3. The inward end of the cylinder 12 is open. A ring 19, brazed, soldered or otherwise fitted inside of the cylinder 12 permits the inward movement of the plunger. This ring is located in such position that it will stop the plunger flush with the rear side of the hopper 3, thus representing the full capacity of the cylinder.

A ring 20 mounted on the outside of the inward end of the cylinder 12 prevents pulling the cylinder out of the front of the bin. This ring 20, as shown in Figure 2, bears against the inward edge of the fixed cylinder 5.

A pointer or marker 21 is movable over a scale 22 on front of the bin 1. The scale may be graduated in any desired manner, the legends in the series 23 indicating pounds of weight. The legends in the remaining series 24 may indicate various price computations so that the user, upon moving the marker 21 to certain designated places, may know the price for the given quantity of material about to be dispensed. It should be understood that the scale 22 may be arranged in any desired manner, the illustration given merely being arbitrary and intended to show one way of disposing the various legends.

The marker 21 is part of a lever 25 which has a handle at the front and reaches back to a pivotal connection 26 (Fig. 2) on the interior of the bin 1. A link 27 connects the lever 25 with a bell crank 28, the long arm of which joins a link 29 reaching in to a point of swivel connection 30 with the plunger 15. By moving the lever 25 up and down the plunger 15 is reciprocated in the measuring cylinder 12 accordingly to vary the capacity of the cylinder. There must be a direct relation between the adjustment of the plunger and the marker 21 so that the various computations on the scale 22 may carry a correct and definite meaning as to the quantity and value of the goods in the measuring cylinder.

A pair of rods 31 support the table 9, mentioned before, the upper ends of these rods are bent at 32 (Fig. 2) so that when they are slipped in openings 33 in the front of the bin 1 they will hold themselves in the pendant position. The table 9 has brackets 34. The rear ends of these brackets are slightly bent (Fig. 2) and provided with openings to receive the rods 31. The weight of the table 9 alone will serve to hold it in any of a number of adjustable positions along the rods, this by virtue of the binding effect of the edges of the openings against the rods.

The operation may be readily understood from the foregoing description. The hopper 3 is filled with such material as is to be dispensed. One of the bins will be used for each different commodity. The bin is adapted particularly for dispensing small grained substances such as sugar, beans, coffee, rice, flour, etc.

The positions of the handle 13 will indicate the position of the measuring cylinder 12. The handle is in line with the opening 14, and when the handle is thus it will indicate that the opening 14 is in registration with the opening 10 of the hopper 3. This is the filling position. When the handle 13 is down it will indicate that the opening 14 is in registration with the opening 11 of the chute 6. This is the discharging position.

Having stood a bag, or other receptacle, on the table 9 beneath the spout 7 the operator moves the marker 21 along the series of legends 23 until the place indicating the desired weight is reached. This action of moving the marker 21 through the lever 25 shifts the plunger 15 along the measuring cylinder to the place which has been properly determined in the manufacture of the apparatus. The handle 13 is then turned 180° to the down position whereupon the material flows into the chute 6 and out of the spout 7. The leaf 16 carried by the plunger, prevents material from entering the measuring cylinder in back of the plunger 15. The leaf 16 is slidable in the opening 14 of the measuring cylinder and rotates therewith when the cylinder is turned as stated.

While the construction and arrangement of the improved computing bin as herein described and claimed is that of a generally preferred form, obviously modifications and changes may be made without departing from the spirit of the invention or the scope of the claims.

We claim:

1. Dispensing apparatus comprising a bin having a pair of openings in the front wall, a hopper situated within the bin, a chute in continuation thereof having a spout extending through the lowermost opening, a cylinder fixed within the bin having a pair of openings around which the hopper and chute are respectively joined, a measuring cylinder inserted through the other front wall opening and having bearing in said fixed cylinder, a disk forming part of said measuring cylinder having a rabbetted edge fitting said opening to prevent the escape of material, a handle fitted exteriorly of said disk in a position in alignment with an opening in the measuring cylinder thereby serving to indicate whether said opening is in a filling or discharging position in respect to either the hopper or chute, means carried by the measuring cylinder engaging the fixed cylinder preventing the withdrawal of the former, a plunger reciprocable in the measuring cylinder, a leaf carried by said plunger occupying the opening therein and causing the plunger to turn with the measuring cylinder and preventing material from falling thereinto in back of the plunger, and means for reciprocating the plunger including a lever, connecting means between the lever and plunger including a swivel connection, a marker carried by the lever, and a scale traversable by the marker.

2. Dispensing apparatus comprising a hopper, a revoluble measuring cylinder having a receiving opening communicable with said hopper, a plunger reciprocable in the cylinder to vary the effective capacity thereof, means including a leaf fixed at one end to the plunger and extending rearwardly therefrom to prevent material from entering the cylinder in back of the plunger, said leaf fitting the cylinder opening and thereby causing the plunger to revolve with the cylinder when the cylinder is revolved, and means including a ring fitted inside of the cylinder beneath said opening upon which ring the free end of the leaf is supported.

3. Dispensing apparatus comprising a hopper, a revoluble measuring cylinder having an opening communicable with the hopper, a plunger situated in the cylinder and having means including a leaf occupying the opening at the rear of the plunger to prevent filling of the cylinder in back of the plunger, said leaf acting as a key to cause the plunger to revolve with the cylinder, means including a link for reciprocating the plunger and thereby changing the effective capacity of the cylinder, and means including a swivel joint connecting the link with the plunger permitting rotation of the latter without affecting the link.

4. Dispensing apparatus comprising a hopper, a measuring cylinder having an opening communicable with the hopper, said cylinder being closed at one end and open at the other, a plunger in the cylinder carrying means including a leaf occupying said opening and closing the cylinder at the rear of the plunger, means situated at the open end of the cylinder including a ring providing a support for the otherwise free end of the leaf, plunger-actuating means including a link extending into the cylinder from the rear and open end, means including a handle applied to the closed end for revolving the cylinder, said leaf acting as a key causing the plunger to revolve therewith, and means including a swivel joint between the link and plunger permitting revolution of the plunger without affecting the link.

5. Dispensing apparatus comprising a hopper, a measuring cylinder having an opening communicable with the hopper and being closed at one end and open at the other, a reciprocable plunger for varying the effective capacity of the cylinder, means including a leaf carried by the plunger slidable in said opening and extending out at the open end of the cylinder, and means including a ring situated inside of the cylinder adjacent the open end providing a support for the free end of the leaf and being in such position as to stop the front face of the plunger flush with an edge of the hopper at the full-capacity position of the plunger.

6. Dispensing apparatus comprising a bin having a hopper on the inside and a circular opening in one wall, a measuring cylinder fitted in said opening to extend across the hopper, said cylinder having an opening registerable with the hopper, means including a disk closing the exposed end of the cylinder and bearing on the front wall to limit the insertion of the cylinder, means including a ring fitted upon the opposite and open end of the cylinder to contact a portion of the hopper and prevent pulling out of the cylinder, a plunger operable in the cylinder, and means for reciprocating the plunger in the cylinder, said means including a link extending into the cylinder from the inner and open end, and including a lever extending out at the front wall of the bin.

7. Dispensing apparatus comprising a bin having a circular opening in one wall, a hopper and a spout situated on the inside, there being a medial cylindrical portion communicating with both and said opening in the front wall, a measuring cylinder inserted through said opening to rotate in said cylindrical portion, said cylinder having an opening communicable either with the hopper or the spout, means including a disk for closing the exposed end of said cylinder, said disk having a rabbetted portion occupying said circular opening and limiting the insertion of the cylinder into said cylindrical portion, and means including a ring fitted on the inner and open end of the cylinder to contact the edge of said cylindrical portion and preventing pulling the cylinder out.

8. Dispensing apparatus comprising a hopper, a revoluble measuring cylinder having a receiving opening communicable with said hopper, a plunger reciprocable in the cylinder to vary the effective capacity thereof, and means including a closure leaf carried by the plunger slidable in the receiving opening for preventing turning of the plunger relative to the cylinder.

ISAAC S. KARRAZ.
DOUGLAS V. BRIDWELL.